US008260237B2

(12) United States Patent
Rosenbusch et al.

(10) Patent No.: US 8,260,237 B2
(45) Date of Patent: Sep. 4, 2012

(54) LNB HAVING INDICATION FUNCTION

(75) Inventors: Michael Rosenbusch, Neuhaus (DE); Martin Josef Beck, Dusseldorf (DE)

(73) Assignees: Michael Rosenbusch, Neuhaus (DE); Martin Josef Beck, Dusseldorf (DE); Eddie Yi-Dee Huang, Taipei (TW)

( * ) Notice: Subject to any disclaimer, the term of this patent is extended or adjusted under 35 U.S.C. 154(b) by 490 days.

(21) Appl. No.: 12/542,869

(22) Filed: Aug. 18, 2009

(65) Prior Publication Data

US 2010/0222018 A1 Sep. 2, 2010

(30) Foreign Application Priority Data

Feb. 27, 2009 (DE) ..................... 20 2009 002 812 U

(51) Int. Cl.
*H04B 17/00* (2006.01)

(52) U.S. Cl. ................. 455/226.4; 455/3.02; 455/159.1; 725/72; 725/68

(58) Field of Classification Search .................. 455/424, 455/425, 456.5, 456.6, 561, 550.1, 575.1, 455/226.4, 188.1, 234.1, 3.02, 159.1; 342/359, 342/361, 73–76, 350; 348/180, 193; 343/703, 343/757; 725/72, 68, 100, 71, 63–65, 81
See application file for complete search history.

(56) References Cited

U.S. PATENT DOCUMENTS 5,347,605 A * 9/1994 Isaksson .......................... 385/92
5,649,311 A * 7/1997 Somei ........................ 455/188.1
5,903,237 A * 5/1999 Crosby et al. ................. 342/359
5,950,139 A * 9/1999 Korycan ....................... 455/566
5,990,928 A * 11/1999 Sklar et al. ....................... 725/72
5,999,061 A * 12/1999 Pope et al. ....................... 331/49
6,434,374 B1 * 8/2002 Muterspaugh ............. 455/234.1
6,538,612 B1 * 3/2003 King ............................. 343/757
6,580,452 B1 * 6/2003 Gangitano .................... 348/180
6,661,373 B1 * 12/2003 Holliday ....................... 342/359
6,693,587 B1 * 2/2004 Kuether et al. ............... 342/359
6,937,188 B1 * 8/2005 Saunders et al. .............. 342/359
6,985,093 B2 * 1/2006 Jaffe et al. ....................... 341/50
7,016,643 B1 * 3/2006 Kuether et al. .............. 455/3.02
7,151,807 B2 * 12/2006 Chen ............................. 375/329
7,161,537 B2 * 1/2007 Rafi et al. ............... 343/700 MS
2004/0058642 A1 * 3/2004 Merio .......................... 455/3.02
2005/0017814 A1 * 1/2005 Kawagishi et al. ........... 331/179
2006/0052078 A1 * 3/2006 Ducasse ........................ 455/341
2007/0058378 A1 * 3/2007 Moriyama et al. ............ 362/378
2007/0195141 A1 * 8/2007 Anma et al. .................... 347/86
2007/0206375 A1 * 9/2007 Piepgras et al. .............. 362/147
* cited by examiner

*Primary Examiner* — Duc Nguyen
*Assistant Examiner* — Charles Chow
(74) *Attorney, Agent, or Firm* — Chun-Ming Shih; HDLS IPR Services

(57) ABSTRACT

A LNB (Low Noise Block Down Converter) having indication function (30A) includes a supporting stage (38), a micro-controller (34), an indication unit (36) and an LNB unit (32). The micro-controller (34) is electrically connected to the indication unit (36) and the LNB unit (32). The micro-controller (34), the indication unit (36) and the LNB unit (32) are installed on the supporting stage (38). The micro-controller (34) sends an indication signal (S2) associated with satellite signal (S1) reception quality from a specific satellite (10) for driving said indication unit (36). A user (40B) at the LNB unit (32) end is allowed to understand the satellite signal (S1) reception status of the specific satellite (10) via the indication signal (S2) sent by the micro-controller (34).

6 Claims, 13 Drawing Sheets

LNB HAVING INDICATION FUNCTION

BACKGROUND OF THE INVENTION

1. Field of the Invention

The present invention generally relates to a LNB, in particular, to a LNB having indication function.

2. Description of Prior Art

LNB (Low Noise Block Down Converter, abbreviated and referred as LNB in the following) is a satellite feed used for lowering frequency and amplifying satellite signals. LNB is used for lowering the frequency of satellite signals from 3.4~4.2 GHz (C band) or 0.7~12.75 GHz (Ku band) to intermediate frequency required by satellite receiver (950 MHz~2050 MHz, the required intermediate frequency range is subject to the types of LNB).

FIG. 1 is a schematic diagram illustrating a satellite receiver receiving satellite signals. Typically, a satellite 10 is distanced from the earth more than 30,000 km. Accordingly, satellite signals S1 of the satellite 10 is weakened upon arriving a dish antenna 20 and a LNB 30 then is used for amplifying the received satellite signals. A coaxial cable 50 is connected between the LNB 30 and a satellite receiver 60. Due to that the signal loss increases as the transmitting frequency of coaxial cable increases, the LNB 30 converts the frequency of the satellite signals S1 from high frequency to intermediate frequency via local oscillating circuit (not shown in the diagram) to facilitate the signal transmission of the coaxial cable 50 and modulation decoding on the satellite receiver 60 in order to display the sound and image carried by the satellite signals on a television set 70.

Traditionally, dish antennas are adjusted in a manner that a user 40A standing outdoors manually adjusts the position and angle of a dish antenna 20 whereas the other user 40B indoor stands in front of the satellite receiver 60 and the television set 70. As the outdoor user 40A adjusting the position and the angle of the dish antenna 20 for better reception of the satellite signals S1, the indoor user 40B talks to the outdoor user 40A directly or via a walkie talkie to inform the outdoor user 40A the display quality of satellite signals S1 on the television set 70, which can be inconvenient under many circumstances.

In order to address the above mentioned inconveniences, new products are developed yet with disadvantages such as the solution is not able to recognize the name of the satellite, the solution is expensive, the solution requires external device and steps to remove the external device upon adjustment is completed etc. . . .

SUMMARY OF THE INVENTION

In order to address the disadvantages of the above mentioned prior art, the invention is mainly to provide LNB having indication function.

The LNB having indication function of present invention comprises a supporting stage; a micro-controller; an indication unit electrically connected to the micro-controller; and a LNB unit electrically connected to the micro-controller. The micro-controller, the indication unit and the LNB unit are installed on the supporting stage. The micro-controller sends an indication signal for driving the indication unit.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
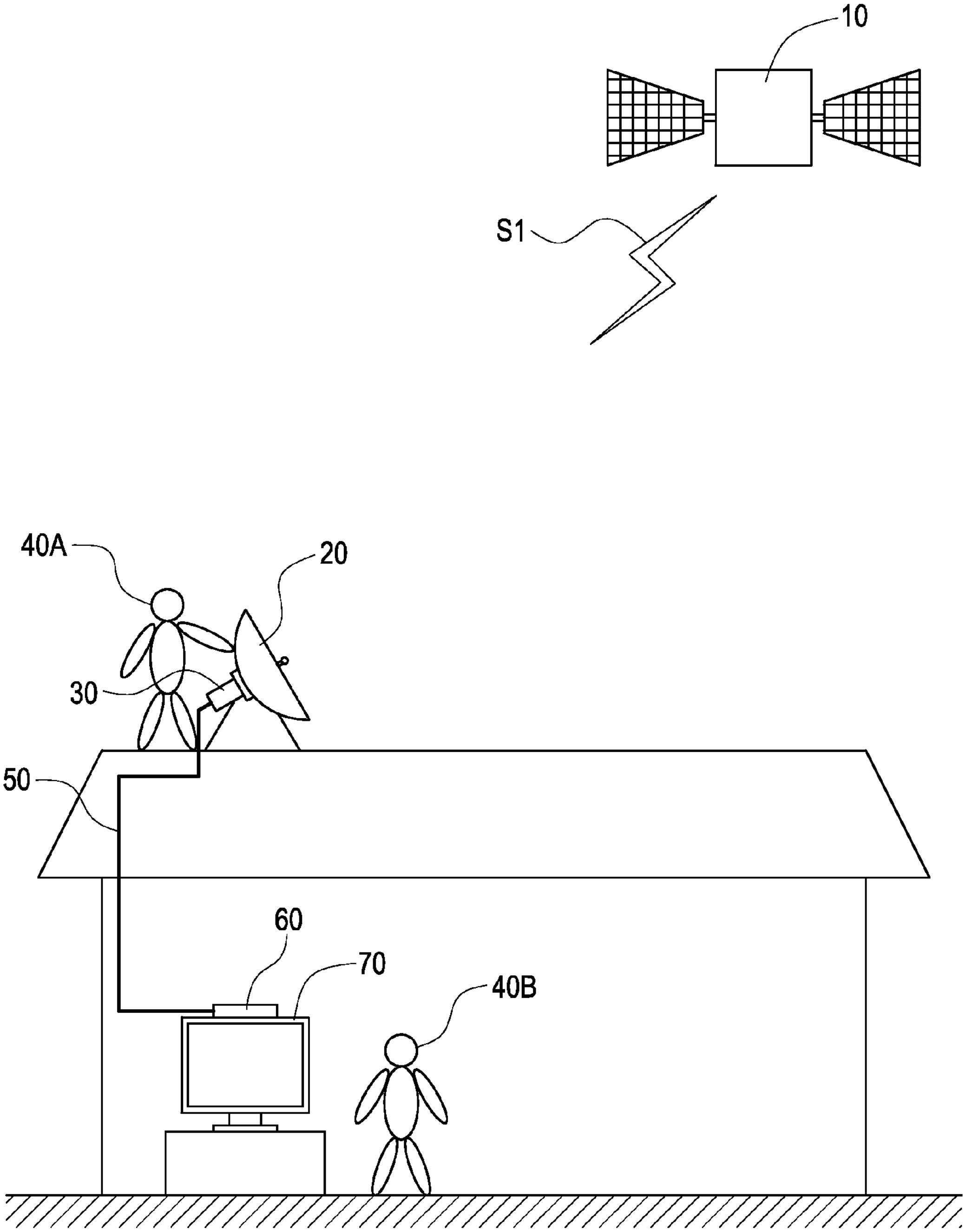
FIG.1 PRIOR ART
FIG. 1 is a schematic diagram illustrating a satellite receiver receiving satellite signals.
Figure 2:
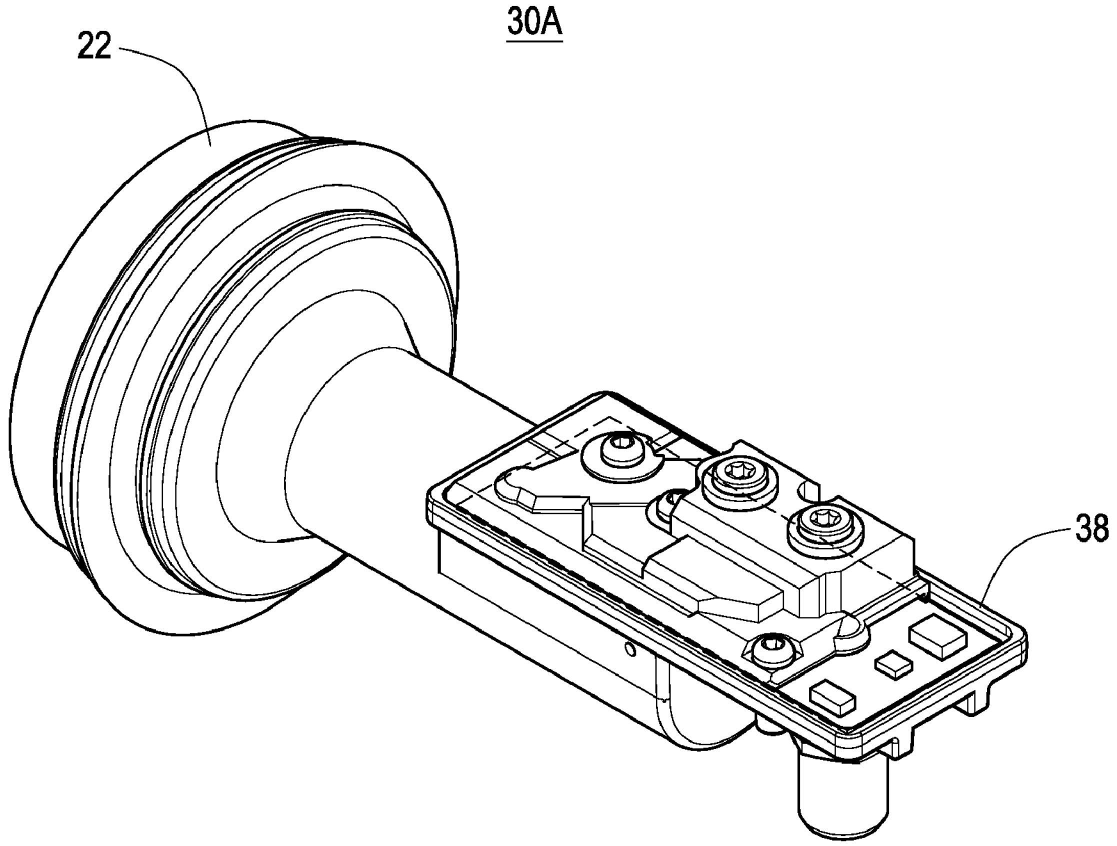
FIG. 2 is an exterior diagram of the LNB having indication function of the present invention.
Figure 3:
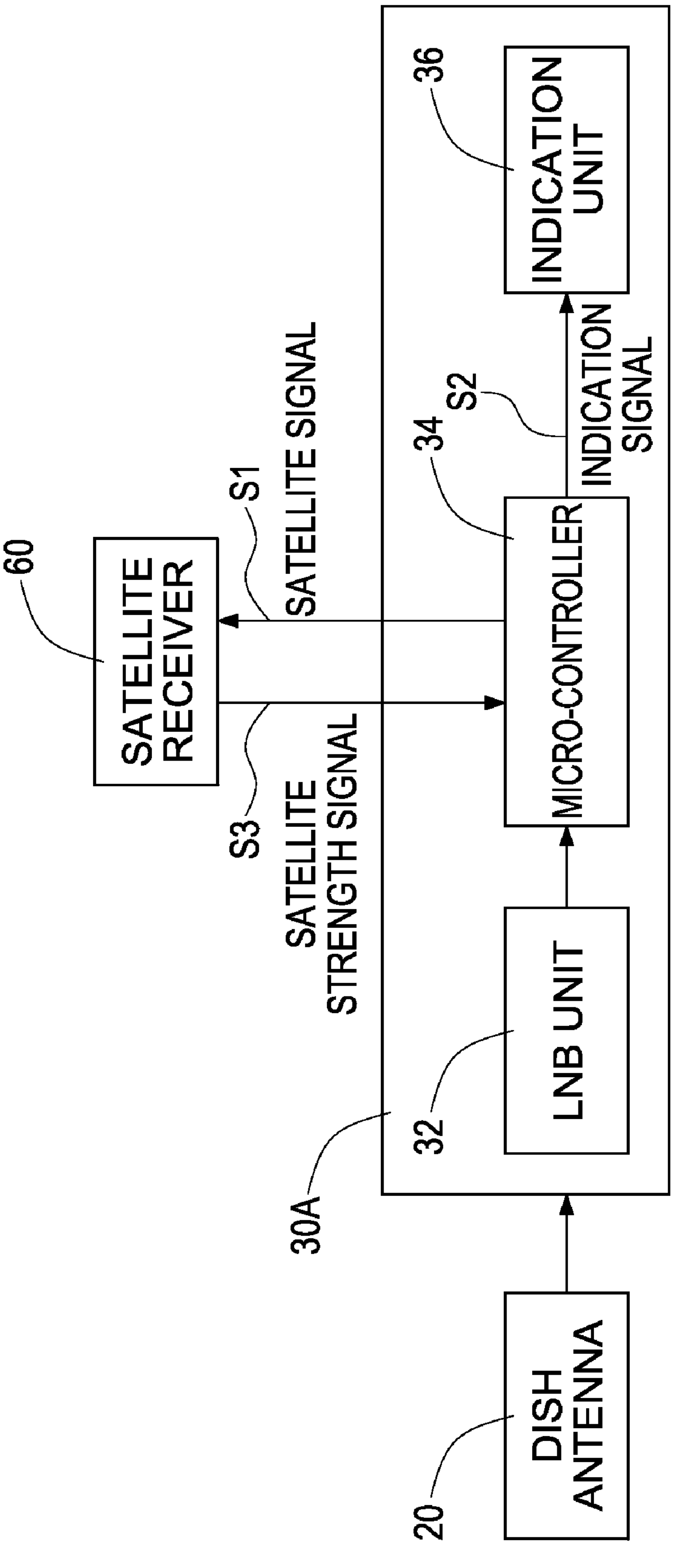
FIG. 3 is a block diagram of the LNB having indication function of the present invention.

FIG. 2 is an exterior diagram of the LNB having indication function of the present invention and FIG. 3 is a block diagram of the LNB having indication function of the present invention. Referring to FIG. 1, the LNB having indication function 30A of present invention replaces the position of the LNB 30 in FIG. 1 in field embodiments.

The LNB having indication function 30A of present invention comprises a wave guide 22, a supporting stage 38, a micro-controller 34, an indication unit 36 and an LNB unit 32. The micro-controller 34 is electrically connected to the indication unit 36 and the LNB unit 32, and the micro-controller 34, the indication unit 36 and the LNB unit 32 are installed on the supporting stage 38. The wave guide 22 is connected to the supporting stage 38.

The indication unit 36 can be components such as an LED or a buzzer for reminding users via emitting light or making sounds. The indication unit 36 can also include a red LED (electrically connected to the micro-controller) and a green LED (electrically connected to the micro-controller) so that the indication unit 36 provide red light, green light and yellow light generated by mixing red and green light.

Figure 4:
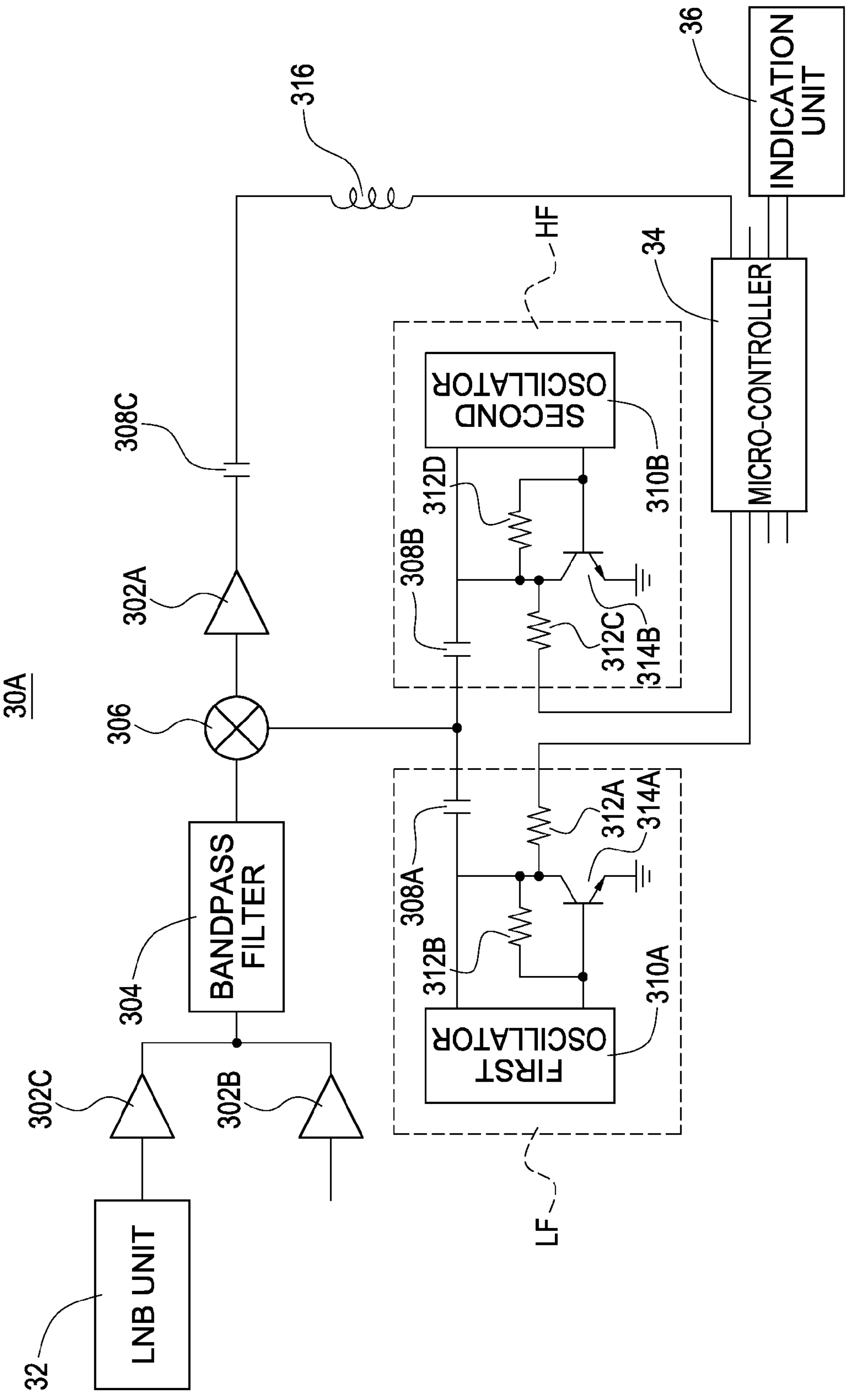
FIG. 4 is a circuit diagram of another embodiment of a LNB having indication function according to present invention.

FIG. 4 is a circuit diagram of another embodiment of an LNB having indication function according to present invention. The LNB having indication function 30A further comprises a first amplifier 302A, a second amplifier 302B, a third amplifier 302C, a bandpass filter 304, a mixer 306, a third capacitor 308C, a first inductor 316, a low frequency unit LF and a high frequency unit HF. The low frequency unit LF comprises a first capacitor 308A, a first oscillator 310A, a first resistor 312A, a second resistor 312B, and a first transistor 314A. The high frequency unit HF comprises a second capacitor 308B, a second oscillator 310B, a third resistor 312C, a fourth resistor 312D, and a second transistor 314B.

The second resistor 312B is electrically connected to the first oscillator 310A, the first capacitor 308A, the first resistor 312A and the first transistor 314A. The fourth resistor 312D is electrically connected to the second oscillator 310B, the second capacitor 308B, the third resistor 312C and the second transistor 314B. The mixer 306 is electrically connected to the bandpass filter 304, the first amplifier 302A, the first capacitor 308A and the second capacitor 308B. The micro-controller 34 is electrically connected to the indication unit 36, the first resistor 312A, the third resistor 312C and the first inductor 316. The third capacitor 308C is electrically connected to the first amplifier 302A and the first inductor 316. The third amplifier 302C is electrically connected to the second amplifier 302B, the bandpass filter 304 and the LNB unit 32.

The micro-controller 34 controls whether to input the low frequency unit LF or the high frequency unit HF into the mixer 306. The micro-controller 34 directly configures the desired receiving frequency bandwidth at the satellite receiver 60 so as to avoid unnecessary channel switching during modulation pause. The micro-controller 34 also can be used for polarization switching.

Figure 5:
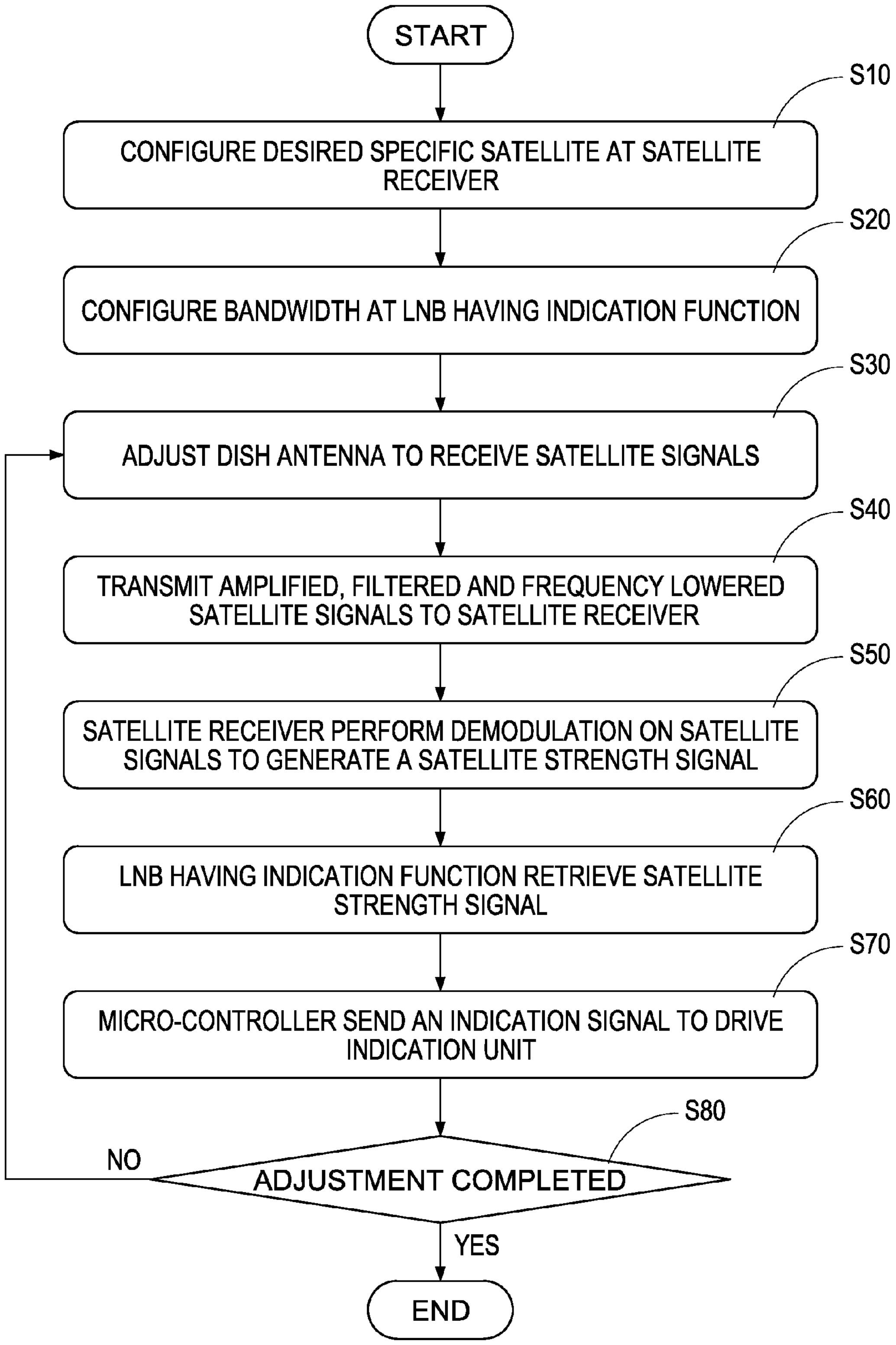
FIG. 5 is a functional flow chart of an indication process of the LNB having indication function of the present invention.

FIG. 5 is a functional flow chart of an indication process of the LNB having indication function of the present invention. Referring together with FIG. 1 and FIG. 3, firstly, the user 40B configures desired specific satellite (S10) to receive at the satellite receiver 60. Following that, the LNB having indication function 30A configures associated bandwidth (S20); and the user 40A standing outdoor adjusting the positions and angles of the dish antenna 20 to receive satellite signals (S30). Following the satellite signals received by the LNB having indication function 30A, the satellite signals are amplified, filtered and frequency-down converted. Consequently, the processed satellite signals are transmitted to the satellite receiver 60 (S40).

Subsequently, the satellite receiver 60 performs demodulation on satellite signals to generate a satellite strength signal S3 to display on the television set 70 (S50). Next, the LNB having indication function 30A retrieves the satellite strength signal S3 (S60). The micro-controller 34 sends an indication signal S2 via the satellite strength signal S3 to drive the indication unit 36 (S70). The user 40A is acknowledged the signal strength of the satellite signals and confirms if the adjustment process is completed (S80). If the signal strength of the satellite signals is bad, the process moves back to the step S30 to repeat the step of adjusting positions and angles of the dish antenna 20. If the signal strength of the satellite signals is good, the adjustment of positions and angles of the dish antenna 20 is completed and the micro-controller 34 stops driving the indication unit 36.

Figure 6:
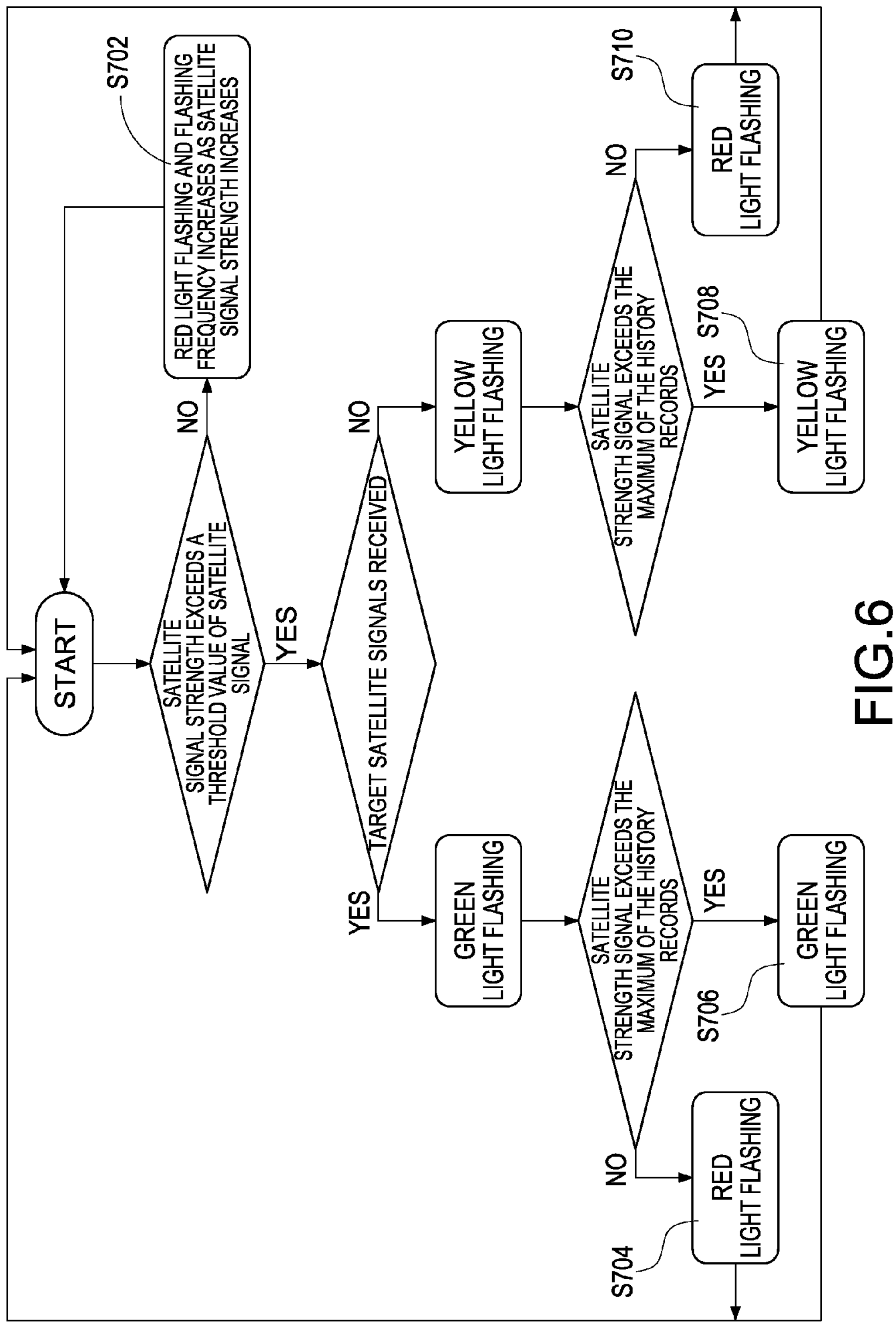
FIG. 6 is an exemplary flow chart of the micro-controller sending the indication signal to drive the indication unit.

FIG. 6 is an exemplary flow chart of the micro-controller 34 sending the indication signal S2 to drive the indication unit 36 (S70). In present embodiment, the indication unit 36 comprises a red LED and a green LED.

Firstly, the micro-controller 34 determines if the satellite strength signal S3 of the satellite receiver 60 exceeds a threshold value of satellite signal. If not, the micro-controller 34 controls the indication unit 36 to emit flashing red light and the flashing frequency increases as the strength of the satellite strength signal S3 increases (S702). When a user sees the flashing red light, the user is acknowledged that the received satellite signals strength is undesirable.

If the satellite strength signal S3 of the satellite receiver 60 exceeds a threshold value of satellite signal, and the satellite receiver 60 determines that the received satellite signals do not come from the satellite configured to receive, then the micro-controller 34 controls the indication unit 36 to have yellow light flashing once. Following that, the micro-controller 34 determines the retrieved satellite strength signal S3 of the satellite receiver 60 exceeds the maximum of the history records. If not, the micro-controller 34 controls the indication unit 36 to have red light flashing once (S710). As a result, when the user sees yellow light and red light flash one after another, the user is acknowledged that the received satellite signals do not come from the desired satellite configured to receive, and satellite signals strength does not improve by adjusting the positions and angles of the dish antenna 20.

If the satellite strength signal S3 of the satellite receiver 60 exceeds a threshold value of satellite signal, and the satellite receiver 60 determines that the received satellite signals do not come from the satellite configured to receive and the micro-controller 34 controls the indication unit 36 to have yellow light flashing once. Following that, the micro-controller 34 determines the retrieved satellite strength signal S3 of the satellite receiver 60 exceeds the maximum of the history records. If yes, the micro-controller 34 controls the indication unit 36 to have yellow light flashing once (S708). As a result, when the user sees yellow light flashing continuously, the user is acknowledged that the received satellite signals do not come from the desired satellite configured to receive, and satellite signals strength improves by adjusting the positions and angles of the dish antenna 20.

If the satellite strength signal S3 of the satellite receiver 60 exceeds a threshold value of satellite signal, and the satellite receiver 60 determines that the received satellite signals come from the satellite configured to receive, then the micro-controller 34 controls the indication unit 36 to have green light flashing once. Following that, the micro-controller 34 determines the retrieved satellite strength signal S3 of the satellite receiver 60 exceeds the maximum of the history records. If not, the micro-controller 34 controls the indication unit 36 to have red light flashing once (S704). As a result, when the user sees green light and red light flashing one after another, the user is acknowledged that the received satellite signals come from the desired satellite configured to receive, and satellite signals strength do not improve by adjusting the positions and angles of the dish antenna 20.

If the satellite strength signal S3 of the satellite receiver 60 exceeds a threshold value of satellite signal, and the satellite receiver 60 determines that the received satellite signals come from the satellite configured to receive, then the micro-controller 34 controls the indication unit 36 to have green light flashing once. Following that, the micro-controller 34 determines the retrieved satellite strength signal S3 of the satellite receiver 60 exceeds the maximum of the history records. If yes, the micro-controller 34 controls the indication unit 36 to have green light flashing once (S706). As a result, when the user sees green light flashing continuously, the user is acknowledged that the received satellite signals come from the desired satellite configured to receive, and satellite signals strength improves by adjusting the positions and angles of the dish antenna 20. The process to adjust the positions and angles of the dish antenna 20 is completed by the user 40A.

In addition to the embodiment shown in the FIG. 6, an alternative indication means is flashing red light indicating the target satellite signals configured to receive are not received; flashing yellow light means target satellite signals configured to receive are received yet the strength is insufficient; and flashing green light means target satellite signals configured to receive are received with good signal strength.

In addition to determining if the received satellite signals come from the satellite configured to receive in the beginning according to the data saved in the satellite receiver 60, video identification data is further saved in the micro-controller 34 as references to assisting with determining if the received satellite signals come from the satellite configured to receive.

The LNB having indication function 30A of present invention combines the LNB, the micro-controller 34 and the indication unit 36 disposed on the supporting stage 38. The indication unit 36 indicates the satellite signal strength and correct position of the satellite such that the outdoor user 40A quickly and correctly adjusts the dish antenna 20 without extra equipments (for example a satellite finder). Also, it is no longer required to have the user 40B standing in front of the satellite receiver 60 and the television set 70 observing, shouting or talking via an intercom to inform the user 40A about the status.

Figure 7:
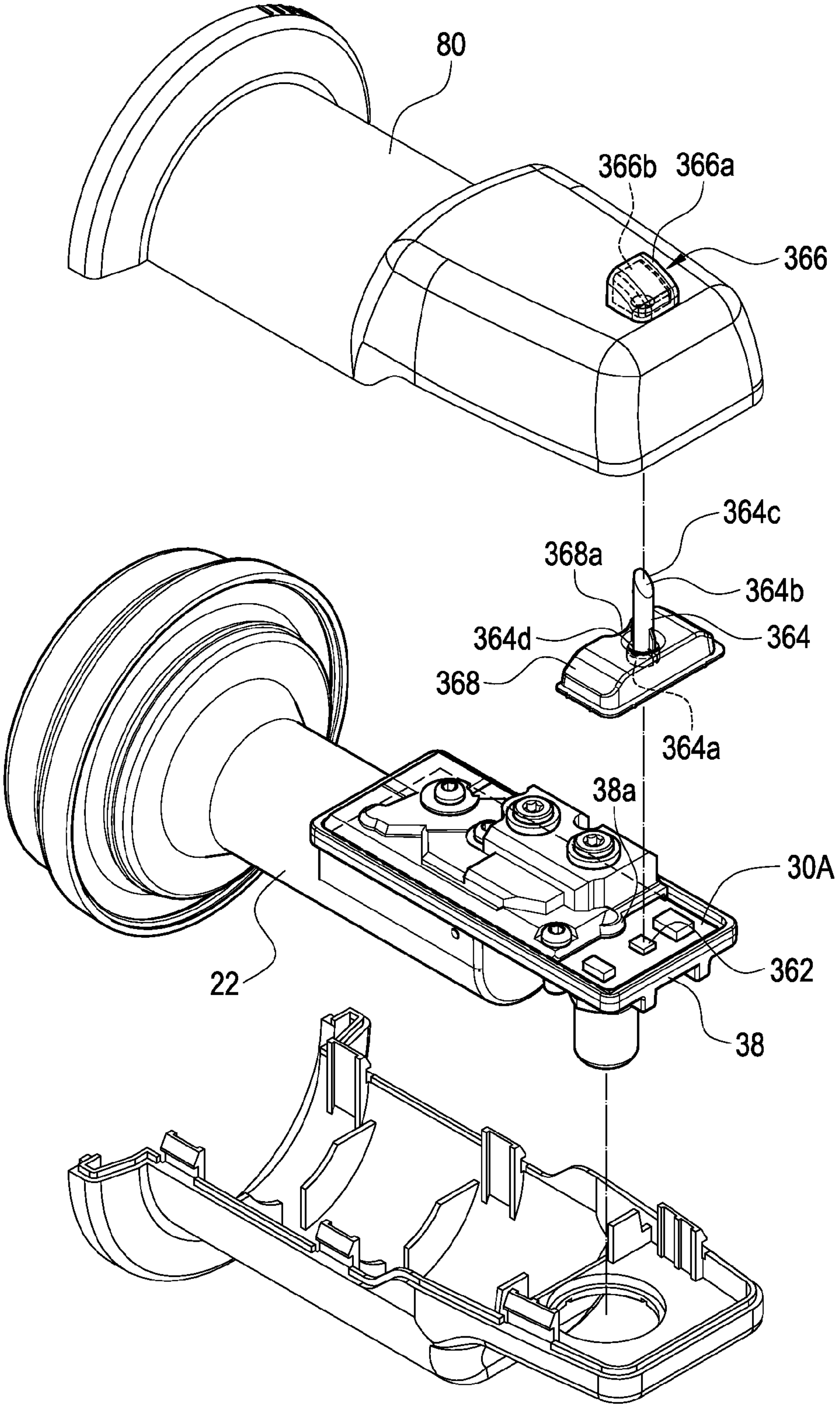
FIG. 7 is an exploded diagram of the embodiment according to the present invention.

The LNB having indication function 30A of present invention is installed outdoor. The designed structure has to be easily observed under the sun to a user so that the outdoor user 40A is acknowledged of the signal strength of the satellite signals. The process is detailed in the following disclosed embodiment where the indication unit 36 is exemplified with the LED 362:

FIG. 7 is an exploded diagram of the embodiment according to the present invention. The LNB having indication function 30A of present invention further comprises an LED 362, a light guide 364, a light cover 366 and a cover unit 368. The cover unit 368 further comprises a depression 368*a*. When the cover unit 368 is disposed on the supporting stage 38, the depression 368*a* and a protruding portion 38*a* of the supporting stage 38 is positioned correspondingly so as to assure the installation is error free. The light guide 364 is a rectangular column and having a light receiving end 364*a* and a corresponding light emitting end 364*b*. The light guide 364 is installed on the a through hole 364*d* of the cover unit 368, extending along the light emitting direction of the LED 362. The light receiving end 364*a* receives the light emitted by the LED 362 along the through hole 364*d*, and guiding the light vertically along the light guide 364. The light emitting end 364*b* has a chamfer 364*c*. The chamfer 364*c* is positioned according to a predetermined angle (for example by 45 degree) to allow the light reflected within the chamfer vertically or horizontally.

Alternatively, the light cover 366 has a cap unit 366*a* and an opening 366*b* disposed on one side of the cap unit 366*a*. The cap unit 366*a* can be integrally formed with the housing 80 of the LNB. The opening 366*b* is disposed corresponding to the chamfer 364*c* of the light emitting end 364*b* so that the light reflected by the chamfer 364*c* transmitting horizontally through the opening 366*b*. The cap unit 366*a* of the light cover 366 is used for effectively blocking external light, as a result the user 40A observes the signal light without being interfered by the surrounding light and is allowed to make correct observation of the light emitting through the opening 366*b*.

Figure 8:
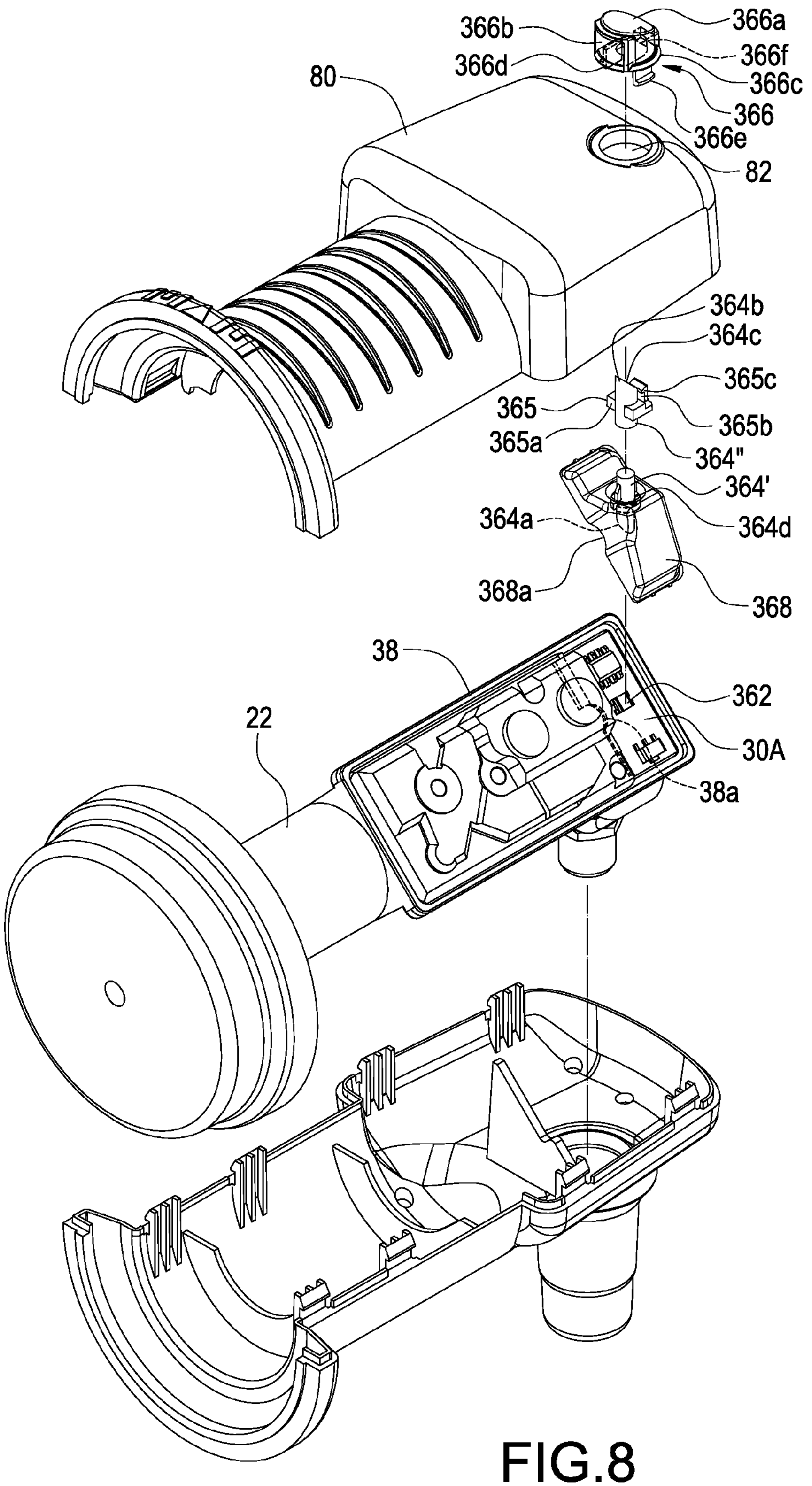
FIG. 8 is another exploded diagram of the embodiment according to the present invention.

FIG. 8 is another exploded diagram of the embodiment according to the present invention. The configuration of the embodiment disclosed in FIG. 8 is similar to the embodiment disclosed in FIG. 7, accordingly, identical components are given the same numerals. The light guide 364 disclosed in FIG. 8 is divided into two parts: a leading column 364' and a guiding column 364" positioned on the leading column 364'. The leading column 364' is a rectangular column and installed on a LED 362 via a cover unit 368. The guiding column 364" is a rectangular column having a chamfer 364*c*. The guiding column 364" is installed rotatably on the leading column 364' (detailed in the following) to form a light receiving end 364*a* and a light emitting end 364*b* rotatable by a certain degree limit.

The LNB having indication function 30A of present invention further comprises a support frame 365, the support frame 365 having a main body 365*a*, a clip frame opening 365*b* formed in the main body 365*a*, and a hook 365*c* extended from the main body 365*a*. The clip frame opening 365*b* is preferably shaped as a circle clipping on the guiding column 364". The light cover 366 further has a base 366*c* disposed on the bottom of the light cover 366, a first clip side 366*d* and a second clip side 366*e* and a clip 366*f* extending from the bottom of the base on one side of the cap unit 366*a*. The light cover 366 is rotatably installed in a hole 82 of the housing 80 via the first clip side 366*d* and the second clip side 366*e*. In further details, the light cover 366 is rotatably installed within the hole 82 via the base 366*c*, the first clip side 366*d* and the second clip side 366*e*.

The hook 365*c* of the support frame 365 is hooked in the clip 366*f* of the light cover 366. As the light cover 366 rotates within the hole 82, the guiding column 364" clipped by the support frame 365 rotates accordingly, such that the angle of the light emitting end 364*b* is changed (it should be noted that the chamfer 364*c* of the clipped guiding column 364" should position corresponding to the opening 366*b* to assure the light is guided through the light cover 366). Consequently, as the user 40A rotates the light cover 366 freely to control the angle of the opening 366*b*, the guiding column 364" also rotates correspondingly to guide the light of the LED 362 through the opening 366*b*.

The cap unit 366*a* of the light cover 366 is used for effectively blocking external light, as a result the user 40A observes the signal light without interfered by the surrounding light and is allowed to make correct observation of the light emitting through the opening 366*b*. Additionally, the user 40A may rotate the light cover 366 to desired angle when required.

Figure 9:
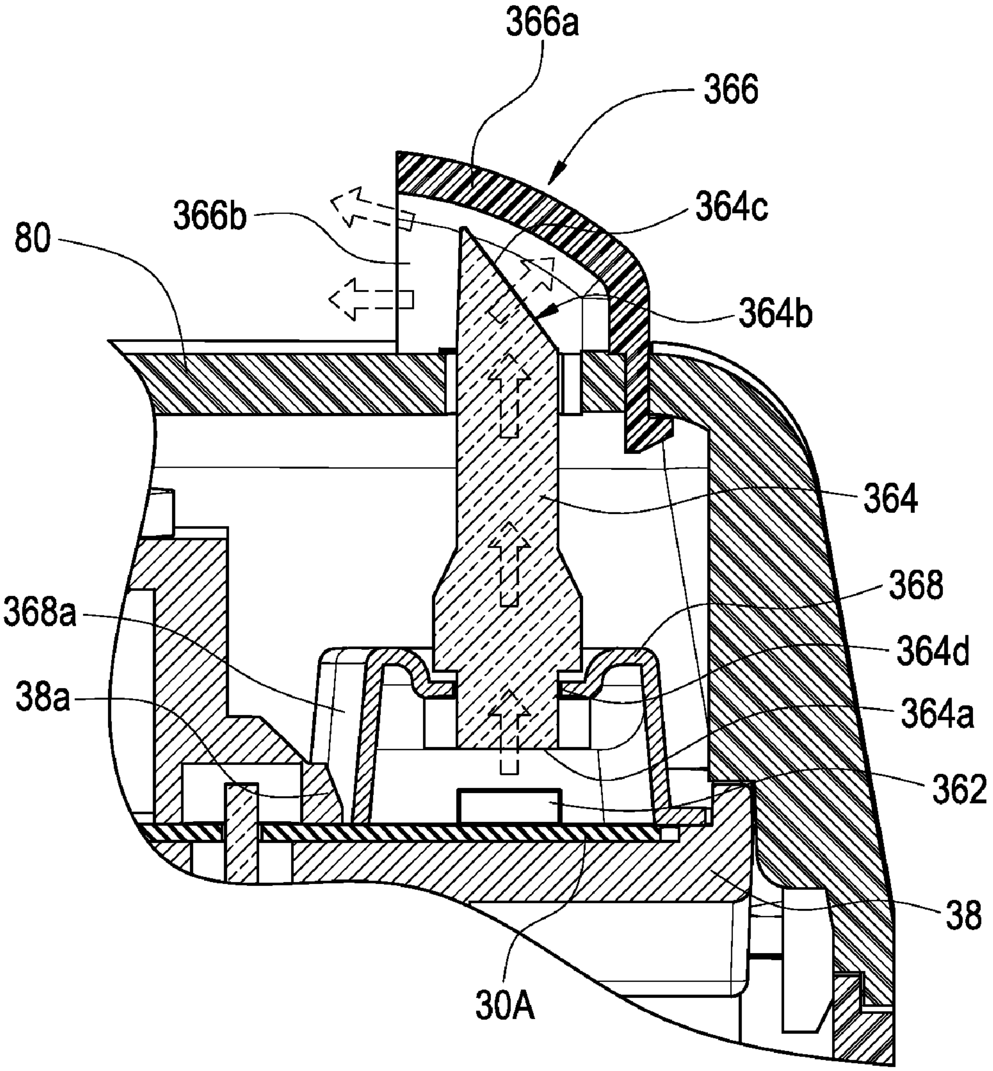
FIG. 9 to FIG. 11 are partial sectional side views of the embodiment according to the present invention.
Figure 10:
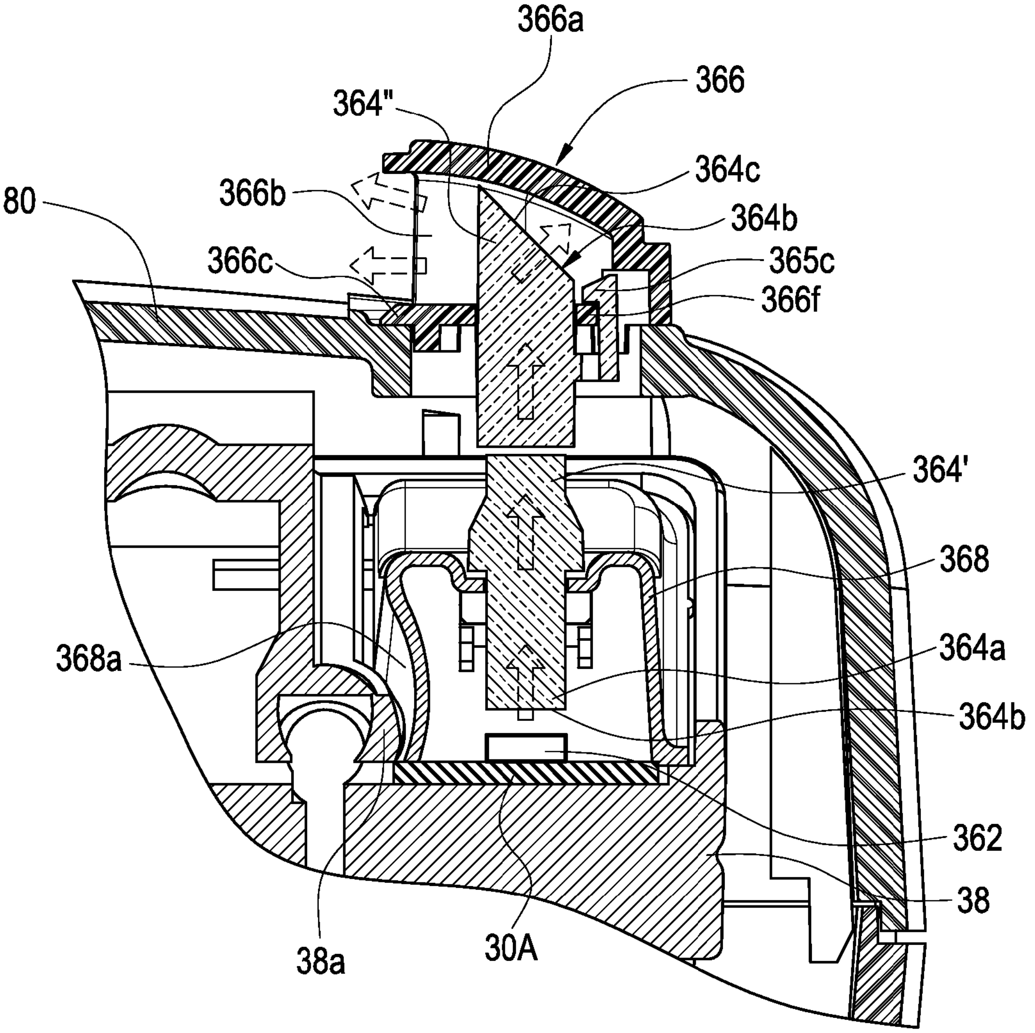
Figure 11:
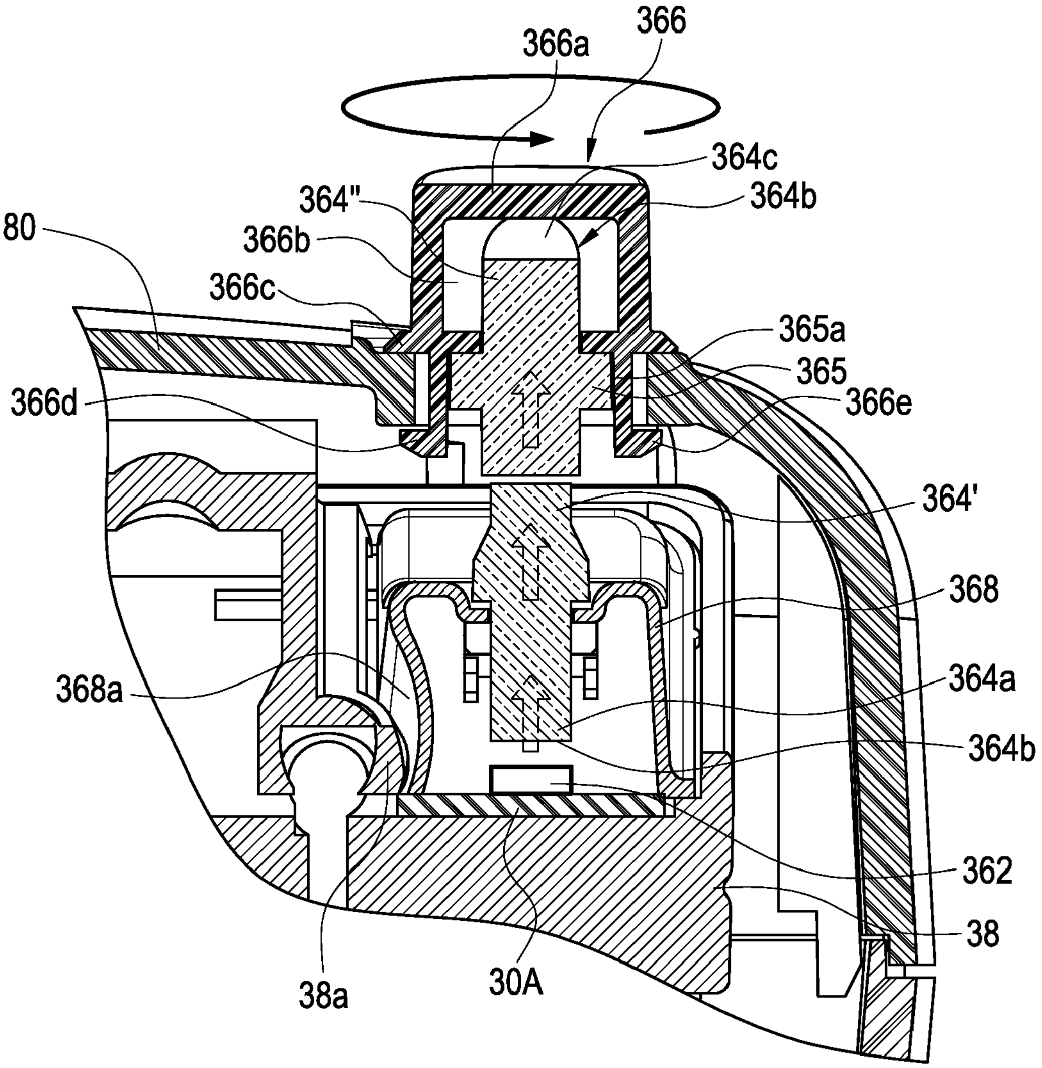
Figure 12:
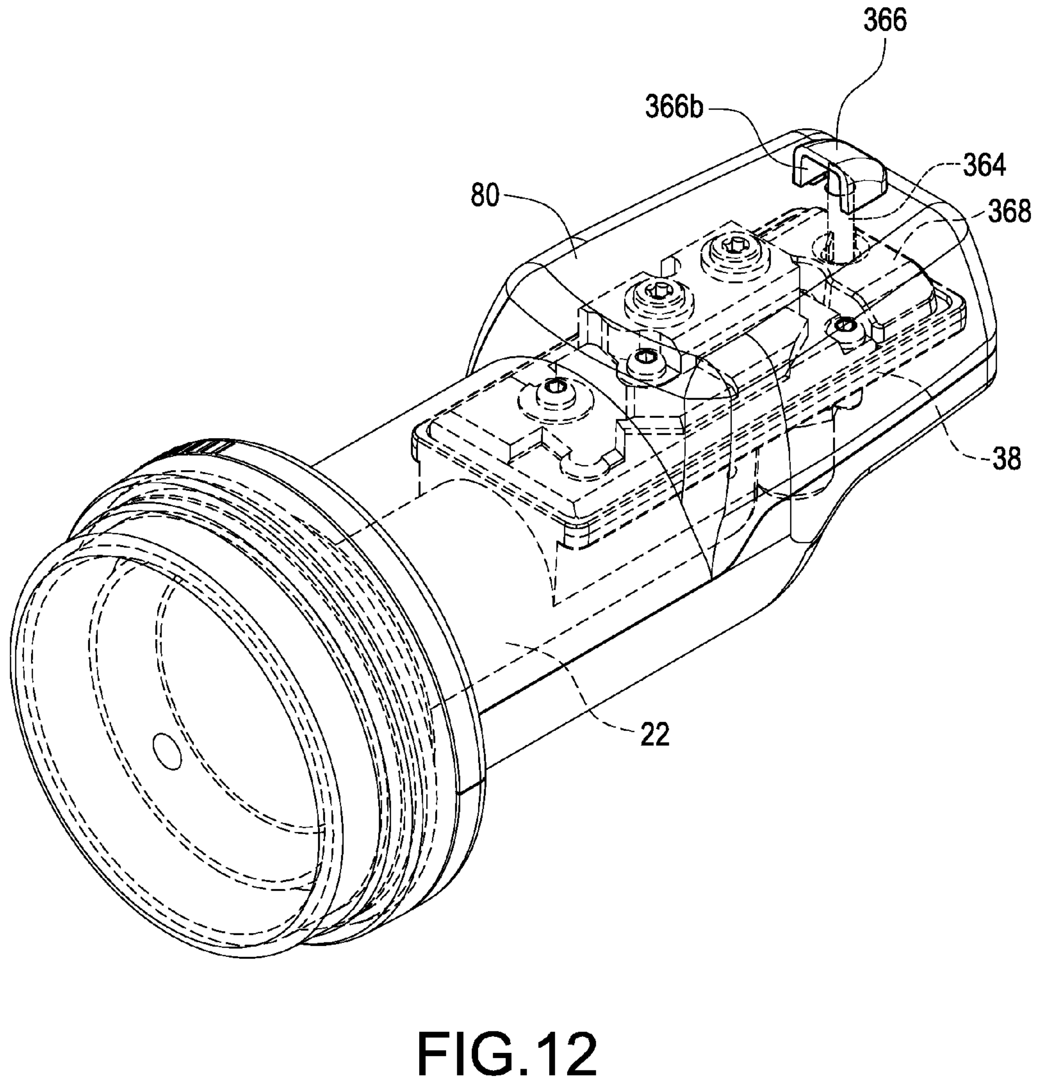
FIG. 12 and FIG. 13 are perspective diagrams 3 of the embodiment according to the present invention.
Figure 13:
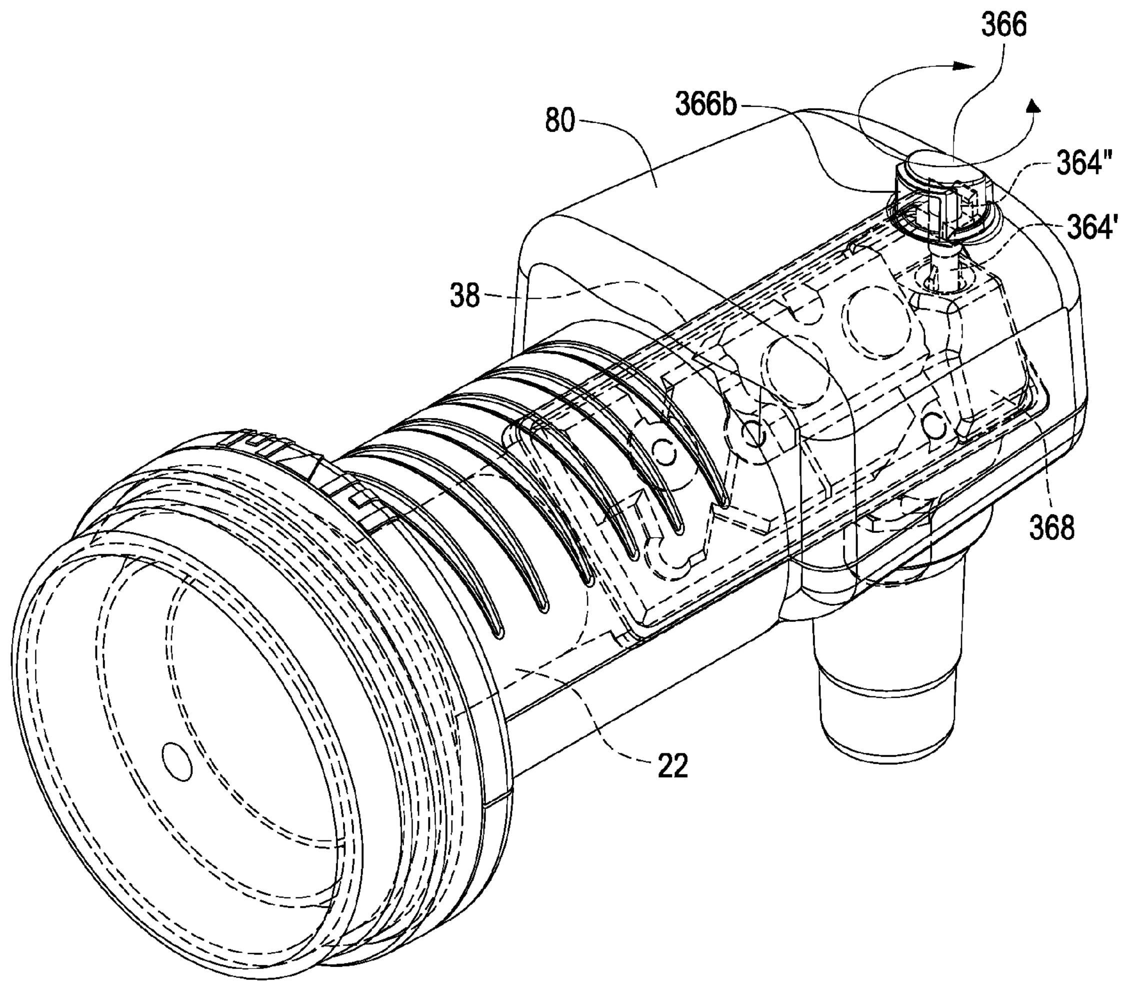

FIG. 9 to FIG. 11 are partial sectional side views of the embodiment according to the present invention. FIG. 12 and FIG. 13 are perspective diagrams 3 of the embodiment according to the present invention.

The LNB having indication function 30A of present invention have the advantages as follows:

1. The implementation according to the present invention improves the inconvenient designs in prior art.

2. The implementation according to the present invention precisely recognizes the name of the satellite configured to receive.

3. The manufacturing cost according to the present invention is low.

4. The implementation according to the present invention can work with prior art LNB without external devices required and the step to remove the device upon adjustment completed. Upon the adjustment completed, the micro-controller 34 stops driving the indication unit 36.

As the skilled person will appreciate, various changes and modifications can be made to the described embodiments. It is intended to include all such variations, modifications and equivalents which fall within the scope of the invention, as defined in the accompanying claims.

What is claimed is:

1. A LNB (Low Noise Block Down Converter) having indication function (30A), applied to a satellite receiver and used for lowering frequency and amplifying satellite signals received by a dish antenna (20) of the satellite receiver, comprising:

a wave guide (22) connected to the dish antenna (20);

a supporting stage (38) connected to the wave guide (22);

a micro-controller (34);

a indication unit (36) electrically connected to said micro-controller (34);

a LNB unit (32) electrically connected to said micro-controller (34);

a housing (80) enclosing the supporting stage (38);

a light guide (364) being a rectangular column and including a leading column (364') and a guiding column (364"), wherein the leading column (364') has a light receiving end (364*a*) installed at one end corresponding to the indication unit (36) so as to receive signal light emitted therefrom, and the guiding column (364") is rotatably positioned on the other end of the leading column (364') and has a light emitting end (364*b*) with a chamfer (364*c*) so that the signal light from the leading column (364') is reflected within the chamfer (364*b*) to change direction;

a light cover (366) rotatably installed on the housing (80) and including a cap unit (366*a*) and an opening (366*b*) formed on the cap unit (366*a*), the cap unit (366*a*) enclosing the light emitting end (364*b*) to block external light so the signal light is correctly observed through the opening (366*b*) without being interfered by the external light, wherein when the cap unit (366*a*) is rotated, the guiding column (364") is driven to be rotated so that the chamfer (364*c*) is rotatable and the signal light transmitted from the light emitting end (364*b*) through the opening (366*b*) is rotatable;

a cover unit (368) disposed on the supporting stage (38), the leading column (364') which extends along a light emitting direction of the indication unit (36) being installed on a through hole (364*d*) of the cover unit (368);

a support frame (365) including a main body (365*a*), a clip frame opening (365*b*) formed in the main body (365*a*) and hook (365*c*) extending from the main body (365*a*), wherein the clip frame opening (365*b*) is substantially shaped as a circle clipping on the guiding column (364"), wherein the light cover (366) further includes a base (366*c*) formed on the bottom of the cap unit (366*a*), and a first clip side (366*d*), a second clip side (366*e*) and a clip (366*f*) extending from the base (366*c*), so that the light cover (366) is rotatable installed on a hole of the housing via the first clip side (366*d*) and the second clip side (366*e*);

wherein the light cover (366) further includes a depression (368*a*) so that when the cover unit (368) is disposed on the supporting stage (38), the depression (368*a*) and a protruding portion (38*a*) of the supporting stage (38) are engaged with each other;

wherein the indication unit (36) further includes a red LED electrically connected to said micro-controller (34) and a green LED electrically connected to said micro-controller (34);

wherein said micro-controller (34), said indication unit (36) and said LNB unit (32) are installed on said supporting stage (38), the satellite receiver (60) performs demodulation on the satellite signals to generate a satellite strength signal (S3), and after the LNB (30A) retrieves the satellite strength signal (S3), said micro-controller (34) is configured to send an indication signal (S2) for driving said indication unit (36); and if the satellite strength signal (S3) does not exceed a threshold value of the satellite signal, the micro-controller (34) controls the indication unit (36) to flash red light through the red LED, and a flashing frequency increases as the strength of the satellite strength signal (S3) increases (S702);

if the satellite signals do not come from a satellite configured to be received, the micro-controller (34) controls the indication unit (36) to flash yellow light once through both the red LED and the green LED, and then the micro-controller (34) determines whether the satellite strength signal (S3) exceeds a maximum value, if not, the micro-controller (34) controls the indication unit (36) to flash the red light and if yes, the micro-controller (34) controls the indication unit (36) to flash the yellow light once; and If the satellite strength signal (S3) come from a satellite configured to be received, the micro-controller (34) controls the indication unit (36) to flash green light once through the green LED, and then the micro-controller (34) determines whether the satellite strength signal (S3) exceeds the maximum value, if not, the micro-controller (34) controls the indication unit (36) to flash the red light and if yes, the micro-controller (34) controls the indication unit (36) to flash the green light once.

2. The LNB having indication function (30A) of claim 1, further comprising:

a low frequency unit (LF) electrically connected to said micro-controller (34); and a high frequency unit (HF) electrically connected to said micro-controller (34).

3. The LNB having indication function (30A) of claim 2 having indication function, wherein said low frequency unit (LF) further comprising:

a first resistor (312A) electrically connected to said micro-controller (34);

a second resistor (312B) electrically connected to said first resistor (312A);

a first transistor (314A) electrically connected to said second resistor (312B);

a first capacitor (308A) electrically connected to said second resistor (312B); and a first oscillator (310A) electrically connected to said second resistor (312B).

4. The LNB having indication function (30A) of claim 3, wherein said high frequency unit (HF) further comprising:

a third resistor (312C) electrically connected to said micro-controller (34);

a fourth resistor (312D) electrically connected to said third resistor (312C);

a second transistor (314B) electrically connected to said fourth resistor (312D);

a second capacitor (308B) electrically connected to said fourth resistor (312D); and a second oscillator (310B) electrically connected to said fourth resistor (312D).

5. The LNB having indication function (30A) of claim 4, further comprising:

a first inductor (316) electrically connected to said micro-controller (34);

a third capacitor (308C) electrically connected to said first inductor (316);

a first amplifier (302A) electrically connected to said third capacitor (308C);

a mixer (306) electrically connected to said first amplifier (302A);

a bandpass filter (304) electrically connected to said mixer (306);

a second amplifier (302B) electrically connected to said bandpass filter (304); and a third amplifier (302C) electrically connected to said bandpass filter (304).

6. The LNB having indication function (30A) of claim 1, wherein said indication unit (36) is a LED (362).

* * * * *